United States Patent [19]
Dykas

[11] 3,988,675
[45] Oct. 26, 1976

[54] TRANSMIT-RECEIVE SWITCHING CIRCUIT WITH AUDIO MUTING

[75] Inventor: George Edward Dykas, Mundelein, Ill.

[73] Assignee: Motorola, Inc., Schaumburg, Ill.

[22] Filed: Nov. 10, 1975

[21] Appl. No.: 630,847

[52] U.S. Cl. .................................. 325/18; 325/21
[51] Int. Cl.² ......................................... H04B 1/40
[58] Field of Search .......................... 325/18, 21, 22

[56] References Cited
UNITED STATES PATENTS

| | | | |
|---|---|---|---|
| 3,617,888 | 11/1971 | Hanus | 325/18 |
| 3,651,407 | 3/1972 | Sarallo | 325/18 |
| 3,946,313 | 3/1976 | Krolik | 325/18 |

*Primary Examiner*—Harold I. Pitts
*Attorney, Agent, or Firm*—Margaret M. Parker; James W. Gillman

[57] ABSTRACT

A two-way AM communications apparatus is provided with common circuitry for biasing the transmitter and receiver on and off alternately while minimizing the switching noise heard in the audio. The push-to-talk button enables either the transmitter or the receiver by means of a transmitter switching network which controls a receiver switching network. When the transmitter is enabled, the audio is muted through a fast-react, slow-decay circuit, and an OR gate and the power amplifier is enabled through a slow-react, fast-decay circuit and a NOR gate. Similarly, when the receiver is enabled, the power amplifier is disabled and the audio unmuted through the same circuitry. A first OR gate is coupled to the channel select switch and noise blanker or other radio circuit to trigger a one-shot multivibrator which in turn is coupled to second inputs of the NOR gate and first OR gates to provide brief audio mute (if receiving) or brief power amplifier disable (if transmitting) during switching periods.

10 Claims, 5 Drawing Figures

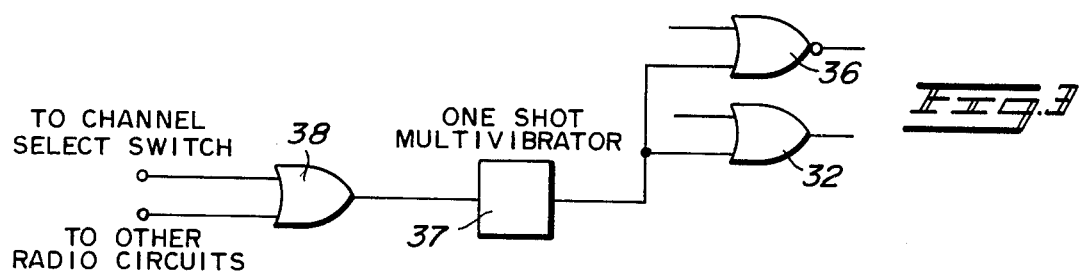
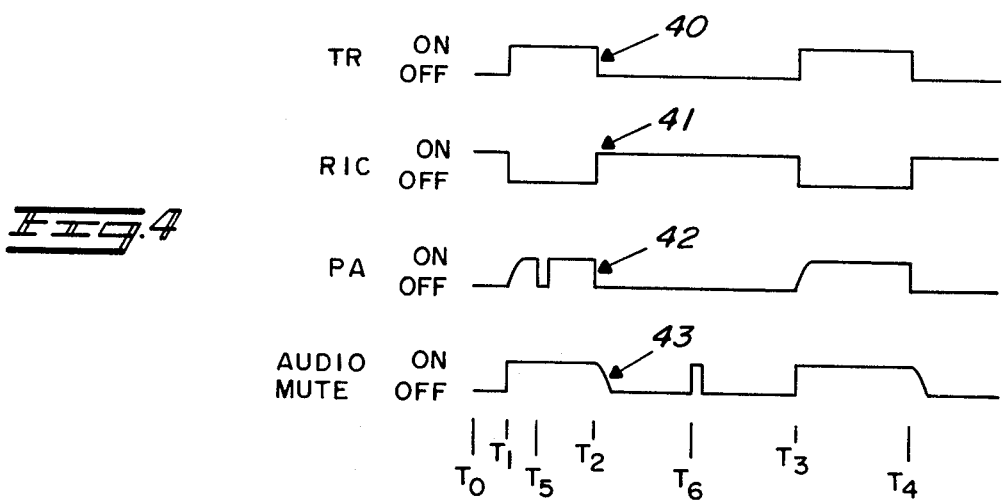
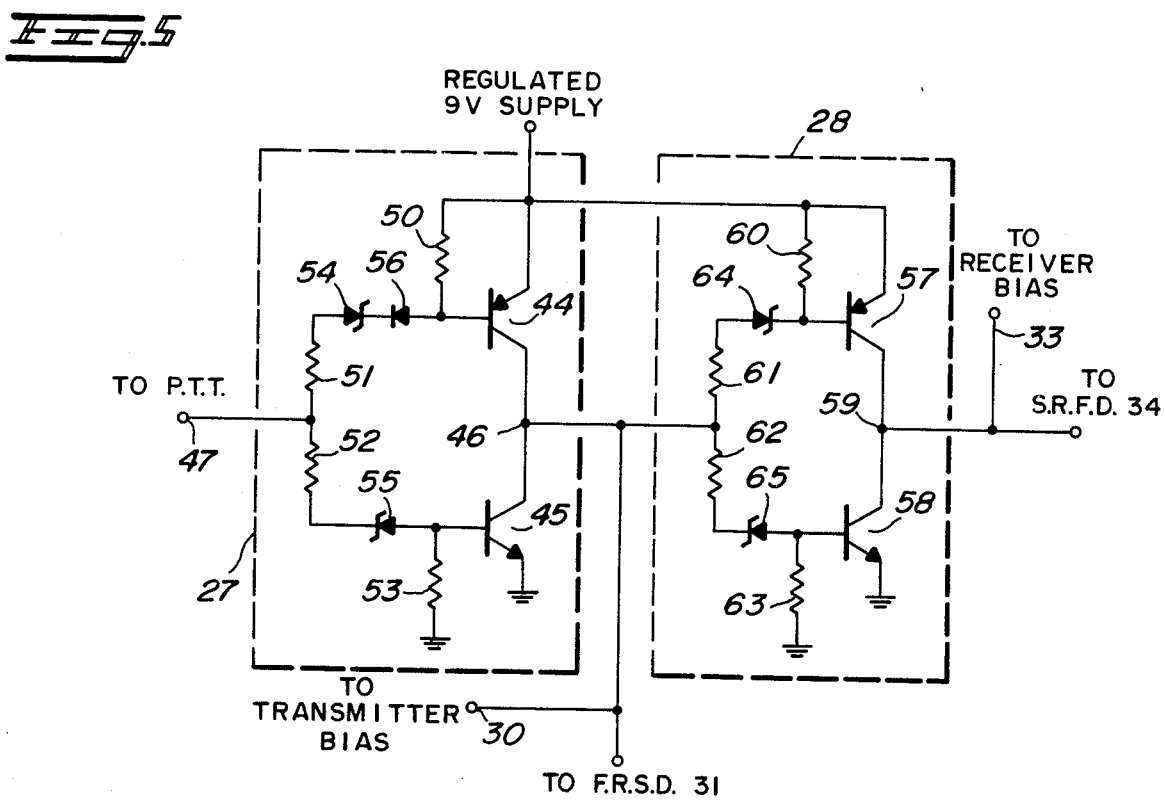

TRANSMIT-RECEIVE SWITCHING CIRCUIT WITH AUDIO MUTING

BACKGROUND OF THE INVENTION

This invention relates to the field of two-way communications equipment, and more particularly to the capability of transmitter-receiver switching with minimum noise output, and channel selection with minimum noise during "receive" and power amplifier protection during transmit.

Most mobile two-way communications equipment utilizes the depression of a "push-to-talk" switch, which is typically located on a hand-held microphone, to initiate transmission. Depression of the PTT switch keys up the transmitter and cuts off the receiver; when the switch is released, the transmitter is turned off and the equipment returns to "receive" mode. Also, most such equipment has the capability of operating on any one of a number of channels. Since the equipment is likely to be used in some type of emergency situation, the latter capability usually makes it possible for the user to locate an unused channel as needed. However, both of these switching functions, as well as other switching circuitry, can cause objectionable noise in the audio output. Channel switching during "transmit" can also cause damage to the transmitter power amplifier and its related circuitry. Therefore, a need exists for a means of eliminating such noise and providing circuit protection without adding unnecessary cost or complexity to the equipment.

SUMMARY OF THE INVENTION

It is, therefore, an object of the invention to provide a means of switching a two-way communications apparatus between operating modes and between channels while, at the same time and with common circuitry, preventing switching noise in the audio output and circuit damage.

The above objectives are accomplished in the present invention by a transmitter switching circuit, a receiver switching circuit—the former controlling the latter—two delay circuits, gating circuits and a one-shot multivibrator.

The gating circuits enable or disable the power amplifier of the transmitter and mute or unmute the audio portion of the receiver, and each gate has one input coupled to the one-shot which in turn is activated by the channel select switch or other circuits. A second input of the gate which enables the power amplifier in the transmitter is activated by the transmit-receive switching circuitry through a slow-react, fast-decay (SRFD) circuit. A second input of the gate which mutes the audio output of the apparatus is activated by the transmit-receive switching circuitry through a fast-react, slow-decay circuit (FRSD). Thus the audio is always muted when the power amplifier is switching.

BRIEF DESCRIPTION OF THE DRAWING

FIG. 3 is a portion of the diagram of FIG. 2 with an alternate embodiment.

FIG. 4 is a function chart showing the on-off relationships of parts of the apparatus.

FIG. 5 is a schematic of the transmitter and receiver switching circuits.

DESCRIPTION OF A PREFERRED EMBODIMENT

Figure 1:
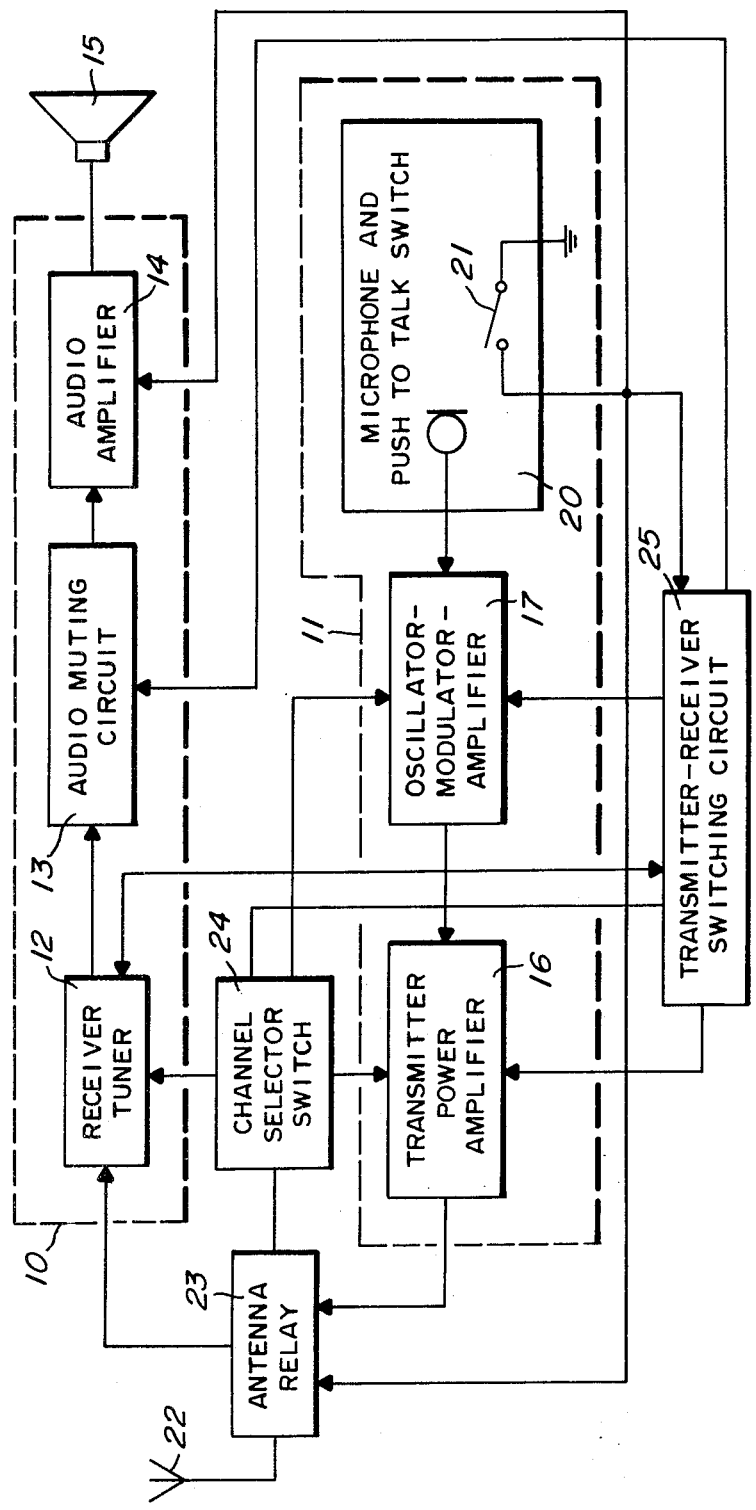
FIG. 1 is a block diagram of a typical two-way communications apparatus embodying the present invention.

The structure and function of the present invention will be best understood in relation to the drawing of which FIG. 1 provides a block diagram of two-way mobile communications device. The device consists essentially of two main sections, a receiver 10 and a transmitter 11. The receiver 10 includes a tuner 12, a muting circuit 13, an audio amplifier 14 and a speaker 15. The transmitter 11 includes a power amplifier 16, an oscillator-modulator-amplifier circuit 17, and a microphone 20 which includes a push-to-talk switch 21. Functioning with both of the two main sections is an antenna 22, an antenna relay 23, a channel selector switch and associated circuitry 24, and the control circuit 25 according to the invention.

Figure 2:
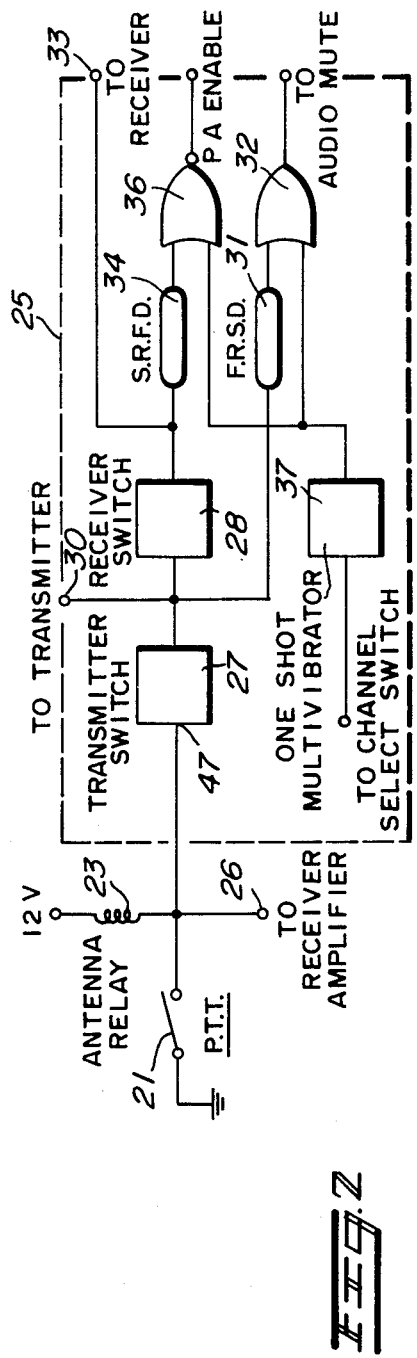
FIG. 2 is a block diagram of the circuit of the invention.

FIG. 2 shows the control circuit 25 broken down into a block diagram and also includes the PTT switch 21 circuit. This type of equipment operates normally in "receive" mode, with squelch when no signal is being received. When the PTT switch is depressed, the antenna 22 is switched from "receive" to "transmit" by the relay 23 which is connected to a 12 v. V supply. The receiver audio amplifier 14 is also biased off during transmission via terminal 26. The control circuit 25 includes a transmitter switching circuit 27 which is coupled to and actuates a receiver switching circuit 28. The transmitter is enabled through the terminal 30 and, through a fast-react, slow-decay circuit (FRSD) 31 and an OR gate 32, the audio muting circuit 13 of the receiver 10 is activated. The receiver switch 28 enables the receiver through a terminal 33 and, through a slow-react, fast-decay circuit (SRFD) 34 and a NOR gate 36, the power amplifier (PA) 16 of the transmitter 11 is disabled.

A one-shot multivibrator 37 whose input is coupled to the channel select switch 24, has its output coupled to second inputs of both the OR gate 32 and the NOR gate 36. The circuits and operation of the switches 27 and 28 will be described hereinafter in relation to FIG. 4.

FIG. 3 is another embodiment wherein the channel select switch 24 is coupled to the input of the one-shot 37 via a second OR gate 38. Other radio circuits, e.g. the noise blanker (not shown) could be coupled to the other inputs of the OR gate 38 for activating the one-shot 37.

FIG. 4 is a function chart showing the on-off relationships 40, 41, 42, 43 of the transmitter 11, receiver 10, PA 16 enable and audio mute 13, respectively. At $T_0$, the receiver is on, the transmitter, PA enable and audio mute are off. At $T_1$, the PTT button has been depressed and the receiver 10 will go off and the transmitter 11 on. Due to the SRFD circuit 34, the PA 16 of the transmitter 11 is slow to come on while the audio mute 13, due to the FRSD circuit 31, is quickly activated. The audio bias function, mentioned hereinbefore in relation to terminal 26, is too slow to provide this capability. Noises due to transmitter turn on are thus prevented from being heard through the audio amplifier 14 and speaker 15. At $T_2$, the PTT switch 21 is released to switch from transmit to receive. Now the PA 16 is disabled quickly through the SRFD circuit 34 before the audio mute 13 is disabled through the FRSD circit 31. $T_3$ is a repeat of $T_1$, and $T_4$ is a repeat of $T_2$.

At $T_5$ and $T_6$ the one-shot has been activated by the channel select switch or other circuitry. At $T_5$ the PA 16 of the transmitter is on and could be damaged by pulses caused by the channel select switch (which may involve a number of relays). Therefore, the PA is briefly disabled through the NOR gate 36. The audio mute 13 is already enabled at this time. At $T_6$, the receiver is on, the PA 16 is already off and the audio mute 13 is disabled. Thus it is only necessary for the channel select switch to enable the audio mute at $T_6$.

FIG. 5 is a schematic diagram of the transmitter switch 27 and receiver switch 28 which form the major part of the switching circuit 25. The switch 27 comprises two transistors 44, 45 in series across a regulated 9 v. supply. The transmitter bias terminal 30 and FRSD terminal 31 connect to the mid-point 46 of the transistors 44, 45. If the transistor 44 is conducting and the transistor 45 is not conducting, the mid-point 46 will be "high", the transmitter will be "on" and the receiver audio mute will be enabled through the FRSD 31. If, on the other hand, transistor 44 is not conducting and transistor 45 is conducting, the mid-point 46 will be "low", and the transmitter will be "off" and the audio not muted.

When the PTT switch 21 is depressed the terminal 47 is grounded, putting approximately 9 v. between the emitter of the transistor 44 and the terminal 47. The transistor 44 will go into saturation and the terminal 30 is high or approximately 9 v. Conversely, when the PTT switch is released, the terminal 47 goes high, transistor 44 is cut off and transistor 45 conducts.

These two transistors control the transmitter, however if both were to conduct at the same time, they would be destroyed. Therefore, the remaining components, resistors 50, 51, 52, 53, zener diodes 54, 55, and diode 56, provide the appropriate voltages with a "dead" zone where neither transistor 44 or transistor 45 will conduct. The zener diodes 54, 55 are chosen to have voltage drops of more than half the voltage of the supply, so that as the voltage on the terminal 47 goes from 0 to 12 v., or from 12 to 0 v., a "dead" zone is created extending from about 3.5 to 5.5 v. where neither transistor 44 or transistor 45 can conduct. Thus, if the PTT switch should arc over because of dust or dirt, or the operator should depress or release the PTT switch slowly, transistors 44, 45 would not be damaged. The diode 56 provides circuit protection for transistor 56 in the event of a voltage rise at the terminal 47.

Since the midpoint 46 of the transmitter switch is also a terminal for the receiver switch 28 (analogous to terminal 47), the same theory of operation applies to the receiver switch. The transistors 57, 58 are connected across the supply voltage with their mid-point 59 supplying voltage for receiver bias 33 and the SRFD 34. When the mid-point 46 is high, the mid-point 59 is low, the receiver is biased off and the power amplifier for the transmitter is actuated through SRFD 34. When the mid-point 46 is low, the mid-point 59 is high, the receiver is biased on, and the power amplifier of the transmitter is disabled. As in the transmitter switch, the resistors 60, 61, 62, 63 and zener diodes 64, 65 provide the appropriate operating voltages and the "dead" zone for the transistors 57, 58. The extra diode is not needed in the receiver switching circuit.

There has been provided for a two-way communications apparatus an improved means of switching from "receive" to "transmit" and from channel to channel with minimal noise and adequate circuit protection from switching pulses. Although specific embodiments are given by way of illustration, it is evident that other modifications and variations would be apparent to those skilled in the art. It is intended to include all such variations as fall within the spirit and scope of the appended claims.

What is claimed is:

1. In a two-way communications apparatus having a transmitter, the transmitter having a power amplifier, a receiver, the receiver having an audio muting circuit, a channel selection means, a voltage supply circuit, a mode switch coupled to the voltage supply circuit, other radio circuits, and a switching and noise silencing circuit coupled to the mode switch and comprising:

a receiver switching circuit;

a transmitter switching circuit coupled to the receiver switching circuit for controlling the latter;

a first delay means having an input coupled to the output of the transmitter switching circuit, a first gating means having a first input coupled to the output of the first delay means and adapted to enable the audio muting circuit;

a second delay means having an input coupled to the output of the receiver switching circuit;

a second gating means having a first input coupled to the output of the second delay means, the gating means adapted to enable the power amplifier; and a monostable multivibrator having an input coupled to the channel selection means and the outputs of the monostable multivibrator being coupled to the second inputs of the first and second gating means.

2. A two-way communications apparatus according to claim 1 and further including a third gating means having a first input coupled to the output of the channel selection means, a second input coupled to another radio circuit and having an output coupled to the input of the monostable multivibrator.

3. A two-way communications apparatus according to claim 1 wherein the transmitter switching circuit comprises first and second amplifier means connected in series across an output of the voltage supply circuit, and first circuit means coupled to the first and second amplifier means for providing that one and only one of said amplifier means is operative at any instant, and wherein the common terminal of the first and second amplifier means is an output terminal for the transmitter switching circuit.

4. A two-way communications apparatus according to claim 3 wherein the first circuit means comprises a first diode means coupled between the voltage supply circuit and the first amplifier means, a second diode means coupled between the voltage supply circuit and the second amplifier means, and first resistor means connected for current limiting in the first circuit means.

5. A two-way communications apparatus according to claim 3 wherein the receiver switching circuit comprises third and fourth amplifier means connected in series across the output of the transmitter switching circuit, and second circuit means connected to the third and fourth amplifier means for providing that one and only one of said amplifier means is operative at any instant, and wherein the common terminal of the third and fourth amplifier means is an output terminal for the receiver switching circuit.

6. A two-way communications apparatus according to claim 5 wherein the second circuit means comprises a third diode means coupled between the transmitter switching circuit output terminal and the third amplifier means, a fourth diode means coupled between the output terminal of the transmitter switching circuit and the fourth amplifier means, and second resistor means connected for current limiting in the second circuit means.

7. A two-way communications apparatus having a transmitter circuit means, a receiver circuit means, and a switching means for enabling one of the circuit means, the switching means comprising:
- a transmitter switching means;
- a receiver switching means;
- a slow-react, fast-delay circuit coupled to the receiver switching means for controlling the power amplifier of the transmitter;
- a fast-react, slow-decay circuit coupled to the transmitter means for muting the audio section of the receiver, whereby the audio is muted while the transmitter is being switched.

8. A two-way communications apparatus according to claim 7 and further including a first gating means having a first input coupled to the output of the fast-react, slow-decay circuit and having an output coupled to the input of the receiver audio section; and
- a second gating means having a first input coupled to the output of the slow-react, fast-decay circuit and the input of the transmitter power amplifier.

9. A two-way communications apparatus according to claim 8 and further including a channel selection means and a monostable multivibrator coupled to the channel selection means for being activated by the operation of the channel selection means, and the output of the monostable multivibrator being coupled to second inputs of the first and second gating means.

10. A two-way communications apparatus according to claim 9 and further including a third gating means having an output coupled to the input of the monostable multivibrator, having a first input coupled to the channel selection means, and having a second input coupled to another radio circuit.

* * * * *